（12）United States Patent
Qi et al.

(10) Patent No.: US 9,302,372 B2
(45) Date of Patent: Apr. 5, 2016

(54) ELECTRIC FASTENING HEAD FOR FASTENING LOCK NUT OF SINGLE THROUGH SHAFT

(75) Inventors: Zhaojun Qi, Dalian (CN); Yuejin Huang, Dalian (CN)

(73) Assignee: DALIAN DEXIN M & E TECHNOLOGY ENGINEERING CO., LTD., Dalian, Liaoning (CN)

( * ) Notice: Subject to any disclaimer, the term of this patent is extended or adjusted under 35 U.S.C. 154(b) by 322 days.

(21) Appl. No.: 13/880,980

(22) PCT Filed: Dec. 3, 2010

(86) PCT No.: PCT/CN2010/001958
§ 371 (c)(1),
(2), (4) Date: May 8, 2013

(87) PCT Pub. No.: WO2012/051742
PCT Pub. Date: Apr. 26, 2012

(65) Prior Publication Data
US 2013/0228050 A1    Sep. 5, 2013

(30) Foreign Application Priority Data

Oct. 23, 2010    (CN) .......................... 2010 1 0516460

(51) Int. Cl.
*B25B 13/02*    (2006.01)
*B23P 19/06*    (2006.01)
(52) U.S. Cl.
CPC *B25B 13/02* (2013.01); *B23P 19/06* (2013.01)

(58) Field of Classification Search
CPC ........ B25B 13/02; B25B 13/10; B25B 13/12; B25B 13/48; B25B 13/44; B23P 19/04; B23P 19/048; B23P 19/06
USPC .......... 81/54, 126, 128, 176.15, 176.2, 176.3, 81/119, 163, 164
See application file for complete search history.

(56) References Cited

U.S. PATENT DOCUMENTS

| 1,037,087 | A | * | 8/1912 | Tuttle | B25B 13/44 |
| | | | | | 81/128 |
| 2,801,562 | A | * | 8/1957 | Stricklett | B25B 13/44 |
| | | | | | 81/163 |
| 6,715,385 | B2 | * | 4/2004 | Wu | 81/176.15 |
| 6,862,957 | B2 | * | 3/2005 | Wang | 81/176.3 |
| 8,495,932 | B2 | * | 7/2013 | Chen | 81/176.15 |
| 8,950,298 | B2 | * | 2/2015 | Yang | 81/176.3 |

* cited by examiner

*Primary Examiner* — Hadi Shakeri
(74) *Attorney, Agent, or Firm* — Novick, Kim & Lee, PLLC; Allen Xue

(57) ABSTRACT

An electric tightening head for tightening a lock nut of a single through shaft, comprising a supporting plate (1), sliding blocks (2), tightening jaws (3), springs (4), wedged pad irons (5), wedged pad iron connecting arms (6), a pulling rod (7), an initial position detecting bolt (8) and stop bolts (9), wherein the supporting plate (1) is connected with the sliding blocks (2), the tightening jaws (3) and the pulling rod (7); the springs (4) are connected with the stop bolts (9) mounted on the tightening jaws (3); the tightening jaws (3) are connected with the wedged pad irons (5); the wedged pad irons (5) are connected with the wedged pad iron connecting arms (6); and an upper end of the pulling rod (7) is connected with the initial position detecting bolt (8).

2 Claims, 1 Drawing Sheet

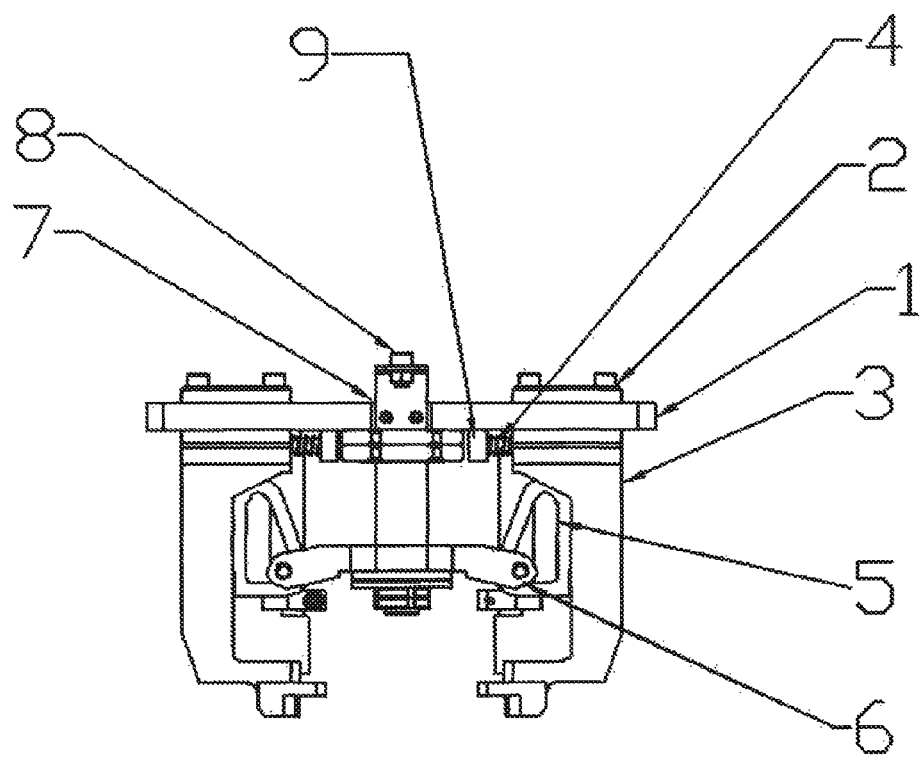

ELECTRIC FASTENING HEAD FOR FASTENING LOCK NUT OF SINGLE THROUGH SHAFT

TECHNICAL FIELD

The present invention relates to an electric tightening machine field, particularly to an electric tightening head for tightening a lock nut of a single through shaft.

BACKGROUND

A flange portion of a common through shaft is integrated with the shaft. In a case where the through shaft is being mounted to axle housing, since a lock nut has already been fitted on the shaft, operations become difficult due to the narrow space. As a result, a specially hook-shaped wrench has to be is used to tighten the nut little by little, which leads to low efficiency, and the torque requirement of the assembly process cannot be met. Finally, it is still necessary to realize locking by means of punching and riveting, which makes the assembly requirement of high-quality driving axle hard to be met.

SUMMARY OF THE INVENTION

In view of the disadvantages in the prior art, the purpose of the present invention is to provide an electric tightening head for tightening a lock nut of a single through shaft which has advantages of simple and convenient operation and high tightening precision.

In order to realize the above purpose, the present invention adopts the following technical solution:

An electric tightening head for tightening a lock nut of a single through shaft, comprising a supporting plate, sliding blocks, tightening jaws, springs, wedged pad irons, wedged pad iron connecting arms, a pulling rod, an initial position detecting bolt and stop bolts, wherein the supporting plate is connected with the sliding blocks, the tightening jaws and the pulling rod; the springs are connected with the stop bolts mounted on the tightening jaws; the tightening jaws are connected with the wedged pad irons; the wedged pad irons are connected with the wedged pad iron connecting arms; and an upper end of the pulling rod is connected with the initial position detecting bolt.

The beneficial effects of the present invention include simple and convenient operation and high tightening precision, and it meets the technical requirements, improves production efficiency and reduces labor cost; further, for field mounting of the lock nut, it resolves the problem wherein it is hard to guarantee assembly technical requirement and wastes time and labor due to structural particularity of the work piece.

BRIEF DESCRIPTION OF THE DRAWINGS

FIG. 1 is a brief structural drawing of the present invention.

DETAILED DESCRIPTION OF THE PREFERRED EMBODIMENTS

The reference numbers in FIG. 1 are as follows: supporting plate 1, sliding block 2, tightening jaw 3, spring 4, wedged pad iron 5, wedged pad iron connecting arm 6, pulling rod 7, initial position detecting bolt 8, and stop bolt 9.

An electric tightening head for tightening a lock nut of a single through shaft, as shown in FIG. 1, is mainly structured as follows: the supporting plate 1 is connected with the sliding blocks 2, the tightening jaws 3 and the pulling rod 7; the springs 4 are connected with the stop bolts 9 mounted on the tightening jaws 3; the tightening jaws 3 are connected with the wedged pad irons 5; the wedged pad irons 5 are connected with the wedged pad iron connecting arms 6; and an upper end of the pulling rod 7 is connected with the initial position detecting bolt 8.

The present invention is connected with a suspended electric tightening machine. Before the tightening machine starts to work, the tightening jaws 3 of the lock nut of the single through shaft are at initial positions, namely the tightening jaws 3 are in an open state; the position of the tightening machine is adjusted so as to be located right above the lock nut of the single through shaft which is to be tightened; then the tightening jaws 3 are fitted on the lock nut of the single through shaft, and the sliding blocks 2 moves inwards so as to drive the tightening jaws 3 to tighten inwards from the open state; the tightening jaws 3 are fitted on the lock nut of the single through shaft, and working ends of the tightening jaws 3 have curved surfaces fitting with a slotted outline structure of the lock nut of the single through shaft; the curved surface on the working end abuts on the lock nut of the single through shaft, is so as to be driven by the tightening machine for rotation.

The invention claimed is:
1. An electric tightening head for tightening a lock nut of a single through shaft, comprising:
   a supporting plate;
   a plurality of tightening jaws each mounted on a sliding block, wherein the sliding blocks are slidably mounted on the supporting plate, wherein each tightening jaw is connected to a wedged pad iron, wherein each wedged pad iron has a slanted surface;
   a pulling rod mounted on the supporting plate, wherein the pulling rod is movable in a direction perpendicular to the supporting plate; and
   a plurality of wedged pad iron connecting arms affixed to the pulling rod, each wedged pad iron connect arm is connected to a wedged pad iron, wherein when the pulling rod moves perpendicular to the supporting plate, the wedge pad iron connecting arms moves along the slanted surface of the wedged pad iron, causing the tightening jaw to move toward the pulling rod in a lateral direction along the supporting plate; and
   a plurality of stop bolts, wherein each stop bolt is mounted on the corresponding tightening jaw and limits a distance of the movement of the tightening jaw in the lateral direction.
2. The electric tightening head for tightening a lock nut of a single through shaft according to claim 1, wherein working ends of each tightening jaw have curved surfaces fitting with a slotted outline structure of the lock nut of the single through shaft.

* * * * *